US008845421B2

(12) United States Patent
Karn

(10) Patent No.: US 8,845,421 B2
(45) Date of Patent: Sep. 30, 2014

(54) GAME OF CHANCE ON INPUT OF CURRENCY FOR AMUSEMENT DEVICES

(75) Inventor: Jeffrey D. Karn, Warrington, PA (US)

(73) Assignee: AMI Entertainment Network, Inc., Bristol, PA (US)

( * ) Notice: Subject to any disclaimer, the term of this patent is extended or adjusted under 35 U.S.C. 154(b) by 82 days.

(21) Appl. No.: 13/567,586

(22) Filed: Aug. 6, 2012

(65) Prior Publication Data

US 2013/0035156 A1 Feb. 7, 2013

Related U.S. Application Data

(60) Provisional application No. 61/515,167, filed on Aug. 4, 2011.

(51) Int. Cl.

| | |
|---|---|
| ***A63F 9/24*** | (2006.01) |
| ***A63F 13/00*** | (2014.01) |
| ***G07F 17/32*** | (2006.01) |

(52) U.S. Cl.

CPC .......... *G07F 17/323* (2013.01); *G07F 17/3267* (2013.01)

USPC .................... 463/29; 463/16; 463/21; 463/23

(58) Field of Classification Search

None

See application file for complete search history.

(56) References Cited

U.S. PATENT DOCUMENTS

| | | | | |
|---|---|---|---|---|
| 4,856,787 | A | 8/1989 | Itkis | |
| 5,016,880 | A | 5/1991 | Berge | |
| 5,575,717 | A | 11/1996 | Houriet, Jr. et al. | |
| 5,743,799 | A | 4/1998 | Houriet, Jr. et al. | |
| 7,361,085 | B2 | 4/2008 | Packes, Jr. et al. | |
| 7,637,812 | B2 | 12/2009 | Higbie | |
| 7,780,525 | B2 | 8/2010 | Walker et al. | |
| 7,862,429 | B2 | 1/2011 | Walker et al. | |
| 7,896,735 | B2 | 3/2011 | Kelly et al. | |
| 7,997,978 | B2 | 8/2011 | Kaminkow et al. | |
| 8,012,009 | B2 | 9/2011 | Iddings et al. | |
| 8,672,752 | B2 * | 3/2014 | Gagner et al. | 463/29 |
| 2006/0089190 | A1 * | 4/2006 | Bryant et al. | 463/20 |
| 2006/0160624 | A1 | 7/2006 | Slomiany et al. | |
| 2007/0293292 | A1 * | 12/2007 | Gipp et al. | 463/16 |
| 2010/0029373 | A1 | 2/2010 | Graham et al. | |
| 2010/0167802 | A1 * | 7/2010 | Walker et al. | 463/11 |
| 2011/0218024 | A1 * | 9/2011 | Baerlocher | 463/16 |

OTHER PUBLICATIONS http://www.gamblersbonus.com/?page=rewards, printed on Aug. 15, 2012, 1 page.

* cited by examiner

*Primary Examiner* — Steven J Hylinski

(74) *Attorney, Agent, or Firm* — Panitch Schwarze Belisario & Nadel LLP

(57) ABSTRACT

A method of awarding a bonus for a play session of a user of an amusement device is disclosed. The amusement device has a display, a memory and a controller. The method includes receiving, by the amusement device, an input of currency from the user. A game of chance sequence for determining the bonus is automatically initiated in response to receiving the input of currency. The game of chance sequence and the determined bonus are displayed and the bonus is applied to the play session.

7 Claims, 9 Drawing Sheets

GAME OF CHANCE ON INPUT OF CURRENCY FOR AMUSEMENT DEVICES

CROSS-REFERENCE TO RELATED APPLICATIONS

This application claims the benefit of U.S. Provisional Patent Application No. 61/515,167, filed on Aug. 4, 2011, entitled "Game of Chance on Input of Currency for Amusement Devices," the entire contents of which are incorporated herein by reference in its entirety.

BACKGROUND OF THE INVENTION

Preferred embodiments of the present invention relate generally to electronic amusement devices, systems and methods. More particularly, preferred embodiments of the present invention are directed to amusement devices and related methods for displaying a game of chance to a user automatically upon input of value or currency into the amusement device when the device is in an attract mode.

Amusement devices having electronic games for computers and touchscreens or other types of amusement devices are generally known in the art. Amusement devices, such as game machines, which allow a user to select games from a video display are known in the art, such as those disclosed in U.S. Pat. No. 4,856,787 ("Itkis"), U.S. Pat. No. 5,575,717 ("Houriet, Jr., et al."), and U.S. Pat. No. 5,743,799 ("Houriet, Jr., et al."), each of which is incorporated by reference and discloses a touchscreen for making a game selection from a menu of games. Such game machines or amusement devices typically operate upon input of currency (i.e., coin, token, paper money, credit/debit cards or the like) and are installed in locations such as bars, restaurants, airports, shopping malls, video arcades, casinos, or the like.

Generally, upon receiving the input of currency, the amusement device switches from an attract mode to a play mode by activating one or more screens for selecting an electronic game playable on the amusement device. The game choices include card games, sports games, games of skill, games of chance, action games, trivia games, or the like. Operators and/or owners of amusement devices prefer insertion of relatively large amounts of currency or value into the amusement devices in order to increase the amount spent by users at the devices during a single or multiple play session(s). To promote the increase of initial payments from users, operators may provide free credit bonuses for relatively large inputs of currency. For example, inputting a one dollar ($1) bill into an amusement device provides two credits, while inputting a five dollar ($5) bill into the same amusement device provides twelve credits (ten paid credits and two free credits) or any other number of credits set by the operator. However, because the received number of credits are predefined and advertised to the user, the user's excitement of receiving the bonus is minimized.

Thus, it is desirable to provide an amusement device which encourages users to input larger amounts of currency into the amusement device to initially play the games on the amusement device, thereby resulting in the amusement device receiving larger initial inputs of currency. Further, it is desirable to provide an amusement device which improves the user's experience or increases the user's excitement in receiving a bonus award for inserting relatively large amounts of currency into the amusement device to initially play the games on the amusement device.

BRIEF SUMMARY OF THE INVENTION

Briefly stated, a preferred embodiment of the present invention is directed to a method of awarding a bonus for a play session of an amusement device. The amusement device has a display, a memory and a controller. The method comprises displaying, by the amusement device, an attract mode on the display, receiving, by the amusement device, an input of a first currency amount or a second currency amount to initiate the play session, displaying, by the amusement device, a game of chance sequence for determining a bonus amount, displaying, by the amusement device, the game of chance sequence and the determined bonus amount and applying, by the amusement device, the determined bonus amount to the play session for use during the play session. The second currency amount is greater than the first currency amount. The game of chance is automatically initiated in response to receiving the input the first or second currency amount. A user's odds of the determined bonus amount are improved when the second currency amount is received than when the first currency amount is received.

An alternative preferred embodiment of the present invention is directed to a method for determining a bonus for a play session of an amusement device. The amusement device has a display, a memory and a controller. The preferred method includes displaying, by the amusement device, an attract mode on the display, receiving, by the amusement device, an input of a currency amount to initiate a play session and displaying, one the display, one of a game of chance and a game selection menu. The amusement device displays the game of chance when the currency amount equal to or greater than a predetermined currency amount. The bonus is determined based on an outcome of the game of chance. The game selection menu is displayed when the currency amount is less than the predetermined currency amount, wherein the bonus is zero.

In another preferred embodiment, a method of awarding a bonus for a play session of a user of an amusement device is disclosed. The amusement device has a display, a memory and a controller. The method includes receiving, by the amusement device, an input of currency from the user. A game of chance sequence for determining the bonus is automatically initiated in response to receiving the input of currency. The game of chance sequence and the determined bonus are displayed and the bonus is applied to the play session.

In yet another preferred embodiment, an amusement device for awarding a bonus to a user is disclosed. The amusement device includes a touchscreen display that presents a game of chance sequence to the user. A memory stores one or more electronic games playable on the amusement device and a plurality of available bonuses. A currency input is configured to receive at least one of coins, paper currency, a credit card/debit card, a player card and a personal identification number (PIN). A controller is operatively coupled to the touchscreen, the currency input and the memory. The controller is configured to automatically perform the game of chance sequence in response to the amusement device receiving an input of currency from the user and determining a bonus to award the user.

In a further preferred embodiment, a method of awarding a bonus for a play session of a user of an amusement device is disclosed. The amusement device has a display, a memory and a controller. The amusement device receives an input of currency from the user and determines a value of the currency input. The amusement device automatically initiates a game of chance sequence for determining the bonus in response to receiving the input of currency. The result of the game of chance is based, at least in part, on the determined value of the currency input. The result of the game of chance and a bonus associated with the result of the game of chance are displayed to the user.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown

DETAILED DESCRIPTION OF THE INVENTION

Figure 1A:
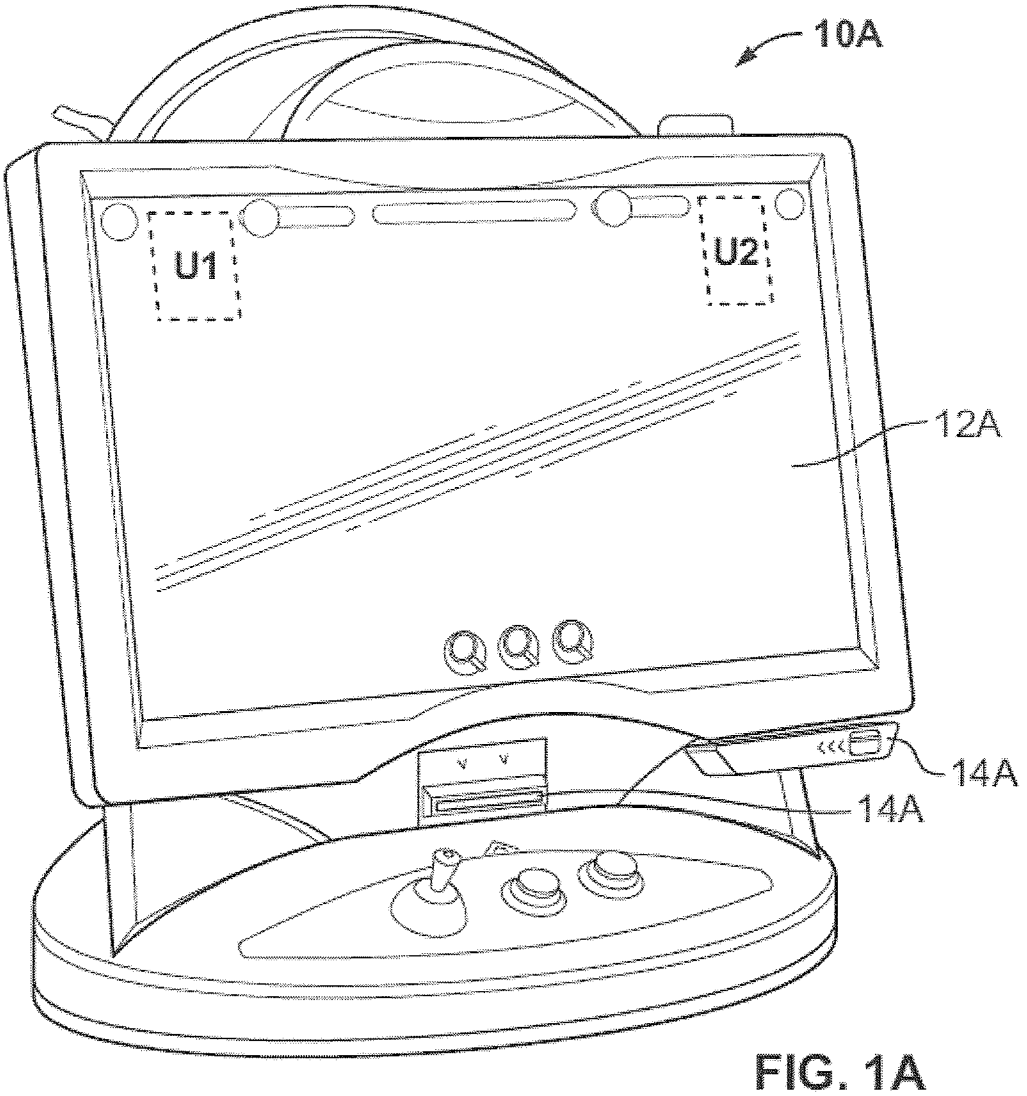
FIG. 1A is a front perspective view of an amusement device in accordance with a first preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the amusement device and designated parts thereof. The terminology includes the above-listed words, derivatives thereof, and words of similar import. Additionally, the words "a" and "an", as used in the claims and in the corresponding portions of the specification, mean "at least one." Further, the terms "coin" or "currency" should not be construed as limiting and can be used herein to mean all forms of coin and paper currency from any country as well as proprietary tokens, game cards, player cards, credit cards, debit cards, chits, Personal Identification Number (PIN) accounts or other representative forms of credit and/or payment.

Referring to the drawings in detail, wherein like reference numerals indicate like elements throughout, there is shown in FIG. 1A a first preferred embodiment of an amusement device 10A. The amusement device 10A includes a controller U1 and a memory U2. The memory U2 can be any known or suitable memory device such as random access memory (RAM), read only memory (ROM), flash RAM, hard disk, optical disk, or the like. The amusement device 10A further includes a video display 12A that is operatively coupled to the controller U1. The amusement device 10A is preferably a counter-top or table-top apparatus, but may be arranged in any configuration, such as free-standing, floor-standing, table mount, wall mount, pole mount, portable, and the like, without departing from the preferred embodiments of the present invention.

Figure 1B:
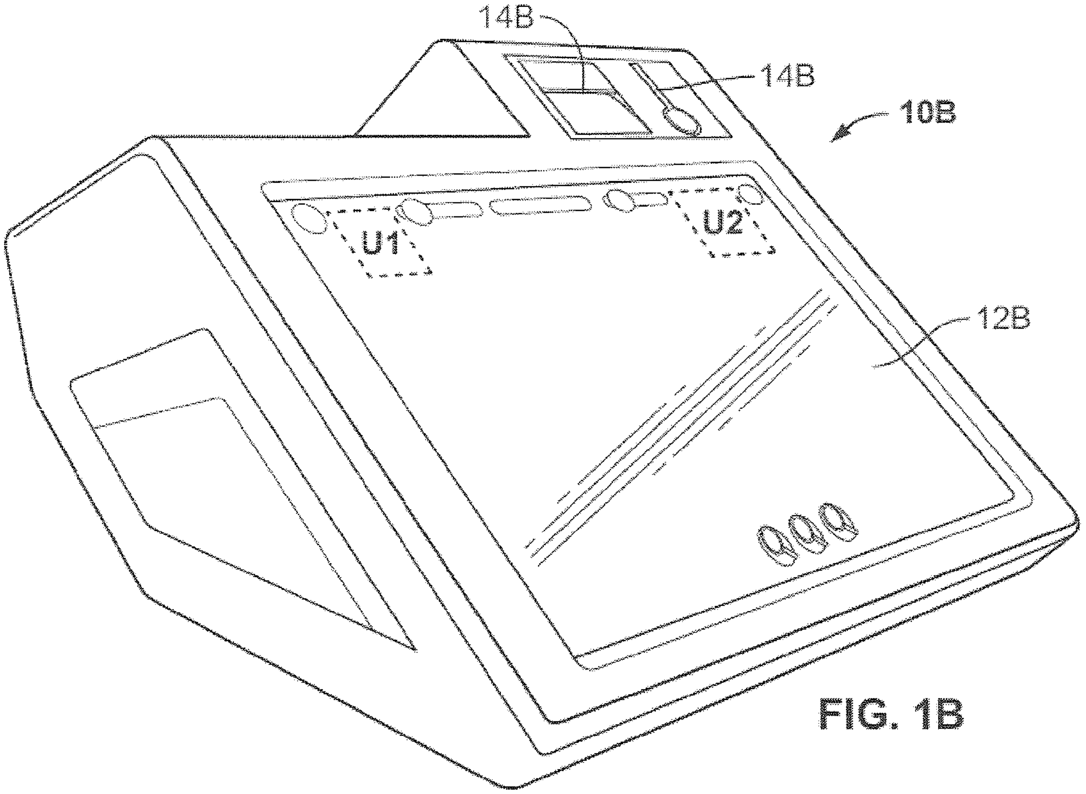
FIG. 1B is a front perspective view of an amusement device in accordance with a second preferred embodiment of the present invention.

The amusement device 10A also preferably includes at least one input component 14A that receives value in order to establish one or more playable credits. The value received may be at least one of paper currency, coins, tokens, chits, credits, credit cards/debit cards, player cards, or the like. Although two input components 14A are shown, the amusement device 10A may include any number of input components 14A to give a user an option for payment, for permitting multiple players, or the like. Preferably, the amusement device 10A is made operable upon actuation of the input component 14A. For example, the user may only be permitted to select and play an electronic game once value is received at the input component 14A and/or one or more playable credits are issued to the user. However, free selections may be offered at the discretion of an operator of the amusement device 10A. In addition, the input component 14A is not necessarily a separate component or element from the video display 12A, as the video display 12A may be comprised of a touchscreen video display 12A and the user may input currency or add credits to the amusement device 10A through interaction with the preferred touchscreen video display 12A FIG. 1B shows another or second preferred embodiment of an amusement device 10B in accordance with the present invention. The second amusement device 10B also includes a controller U1, a memory U2, a video display 12B, and at least one input component 14B. Preferably, the video displays 12A, 12B are touchscreen video displays configured to accept touch input for inputting credit, playing games associated with the preferred amusement devices 10A, 10B of the first and second preferred embodiments, or otherwise permitting the user or player to interact with the preferred amusement devices 10A, 10B.

Figure 1C:
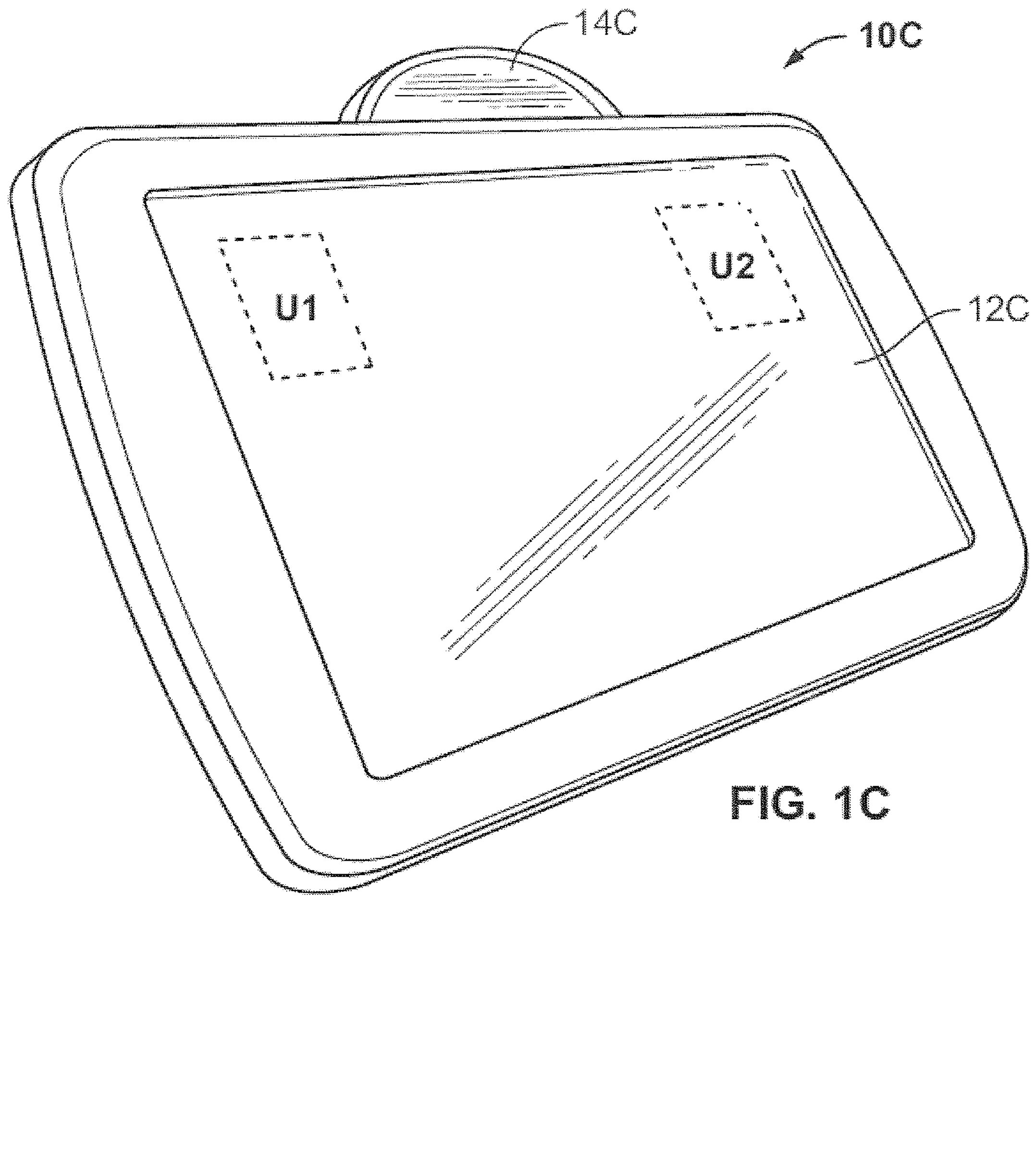
FIG. 1C is a front perspective view of an amusement device in accordance with a third preferred embodiment of the present invention.

FIG. 1C shows yet another or third portable amusement device 10C in accordance with a third preferred embodiment of the present invention. The third amusement device 10C is preferably a portable device, preferably battery-powered, and includes a controller U1, a memory U2, a display 12C, and at least one input component 14C. The third amusement device 10C is preferably usable with a docking station (not shown). The docking station preferably secures the device 10C until access is required by an operator or is paid for by a user. Release from the docking station may occur via an entry through the input component 14C, which is preferably a card reader. The docking station may also provide battery recharging and other services to the amusement device 10C.

For convenience, the amusement devices 10A, 10B, 10C of the first, second and third preferred embodiments will be referred to hereinafter simply as "amusement device 10," the displays 12A, 12B, 12C will be referred to hereinafter simply as "display 12," and the input components 14A, 14B, 14C will be referred to hereinafter simply as "input component 14."

Turning now to the operation of the amusement device 10, the memory U2 preferably stores one or more application programs, such as electronic games, a music or video jukebox program, or the like, and a system control program. However, the one or more application programs may also be stored remotely. The controller U1 controls the touchscreen display 12 based upon the system control program retrieved from the memory U2 and based upon inputs from the touchscreen display 12. As used herein, the system control program refers to all of the software functions outside of the application program files including an operating system, device profile, display control, input/output control, communications, sound drivers, and the like. Other input devices which may be connected to the amusement device 10 include a pushbutton(s), a trackball or touchpad, a mouse, a joy-stick, a foot-pedal, a voice recognition system, a keypad or keyboard, and the like. But, preferably, the input device is the touchscreen display 12.

Figure 2:
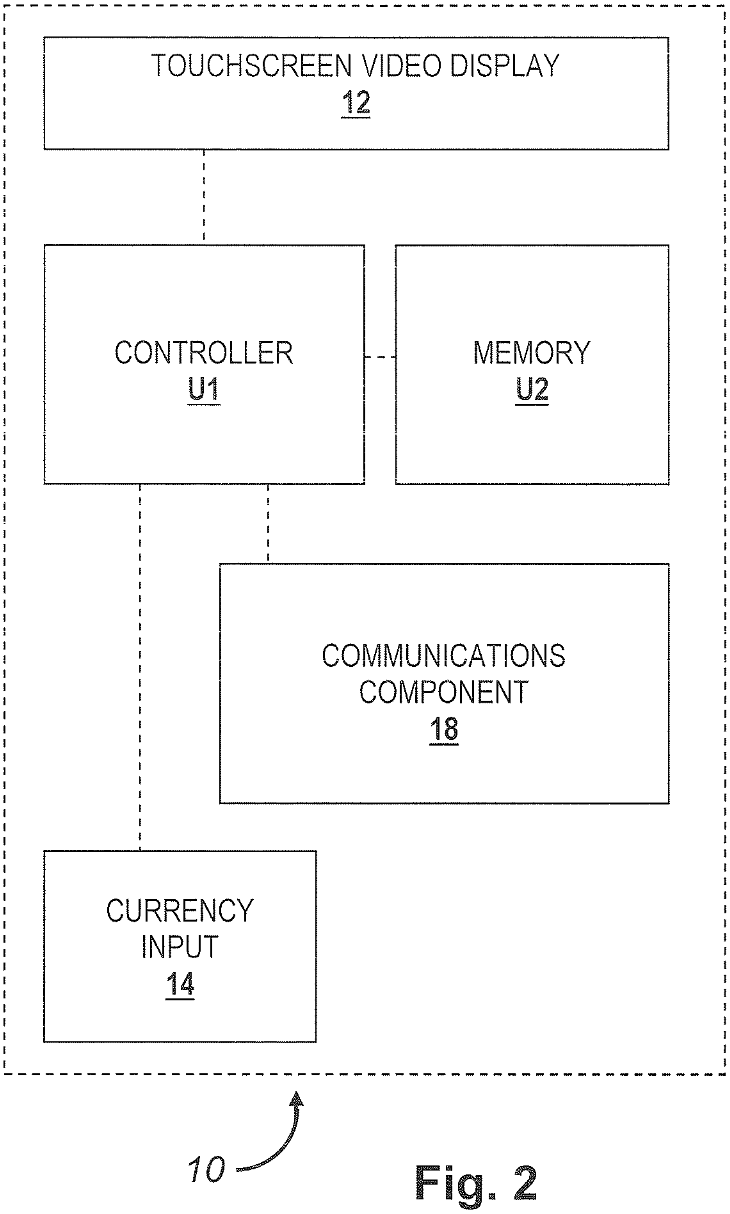
FIG. 2 is a schematic block diagram of an amusement system in accordance with preferred embodiments of the present invention that may incorporate any of the preferred amusement devices of FIGS. 1A-1C.
Figures 7A, 7B:
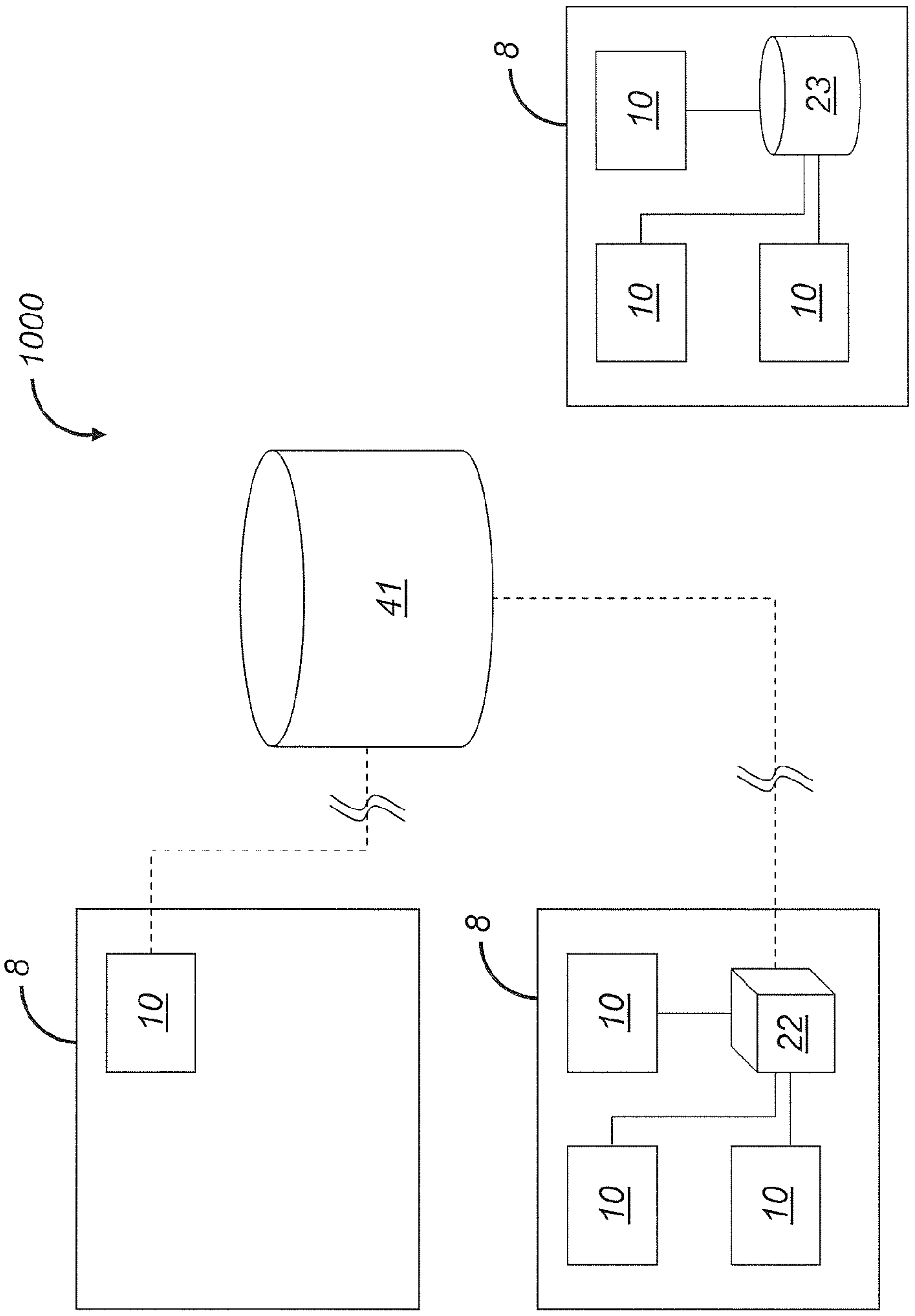
FIG. 7A is a schematic block diagram of a preferred configuration of an amusement device system in accordance with certain preferred embodiments of the present invention.
FIG. 7B is a schematic block diagram of a gaming location having a local server in accordance with a preferred embodiment of the present invention.

FIG. 2 is a block schematic diagram of the amusement device 10 described above. The touchscreen display 12 is coupled to the controller U1. Also coupled to the controller U1 is a currency input 14. The currency input 14 may accept at least one of coins (or tokens), currency (e.g. paper money or the like), credit cards/debit cards, player cards and the like. Although only one currency input 14 is shown, the amusement device 10 may include more than one input component 14 to give a user an option for payment, for permitting multiple players, or the like. Preferably, the amusement device 10 is made operable upon payment by a user, which may optionally be received via the currency input 14. The currency to initiate game play or a play session may alternatively be received by the amusement device 10 through interaction of the user with the preferred touchscreen display 12. For example, the touchscreen display 12 may prompt a user for a user account number and password that provides access for the user and amusement device 10 to the user's account in the memory U2, at a local server 23, at a communications hub 22, at a central server 41 or the like (FIGS. 2, 7A and 7B). The user may then be able to add credits to the amusement device 10 from their stored user account to commence game play.

The amusement device 10 also includes preferably a communications component 18, such as an Ethernet port, a wireless transceiver, an infrared (IR) port, or the like. Using the communications component 18, the amusement device 10 may communicate with other devices or file servers, access the Internet, communicate over wide area networks (WNs) or local area networks (LANs), or the like. For example, the amusement device 10 may connect with a second amusement device (not shown) using the communications component 18. The second amusement device 10 optionally includes all of the same components and features as amusement device 10. The communications component 18 is operatively coupled to the controller U1 and through the controller U1 to the memory U2. The amusement device 10 preferably includes at least an attract mode, an operating mode and a setup mode. To switch from the operating mode to the setup mode, a mode selector pushbutton (hardware not shown) is provided that is typically concealed from the users. The mode selector pushbutton may be implemented as a hidden software feature, but preferably the mode selector pushbutton is a simple pushbutton that is disposed inside a housing of the amusement device 10. When the setup mode is selected, the owner/operator is permitted to make system setup adjustments. When the operating mode is selected, a player or user is selectively permitted to access the application programs. In addition, in the operating mode, the amusement device 10 of the preferred embodiment typically defaults to the attract mode to attract user's to the amusement device 10 to promote game play.

Though the amusement device 10 is in operating mode, it is typically not operable by the user until an input of currency is received. Prior to receiving the input of currency, the amusement device 10 displays, in an attract mode, one or more screens on the touchscreen 12 to entice passers by to interact with the amusement device 10 by inputting currency into the amusement device 10. Generally, such screens are animations of game play of various electronic games playable on the amusement device 10. These animations (e.g., demos) are typically clips of the game being played without user interaction. Other screens for advertising may also be presented. In addition, the display 12 may be blank or not display games or advertisements while in the attract mode. After currency is input by the user, the amusement device 10 enters a play mode and becomes operable for playing games, videos, and/or music. In a preferred embodiment, once currency is input and before the device is made operable, the amusement device 10 initiates a game of chance sequence to award the user a bonus for the play session.

Figure 3:
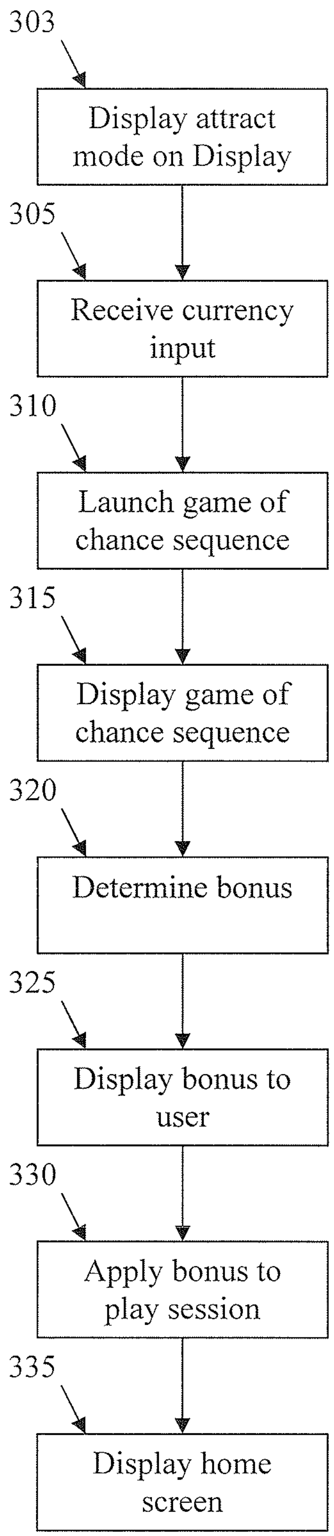
FIG. 3 is a flowchart diagram illustrating steps for determining a bonus awarded to a user's play session in accordance with preferred embodiments of the present invention.

FIG. 3 is a flowchart illustrating steps for determining a bonus awarded to the play session of a user in accordance with preferred embodiments of the present invention. Referring to step 303, the amusement device 10 is preferably, initially in its default attract mode, wherein simulated game play, advertisements, photographs, video graphics, a blank screen or the like are displayed on the video display 12. Referring to step 305, a user inputs a currency amount into the amusement device 10 and the amusement device 10 receives the currency to initiate a play sequence. Upon receiving the input currency amount, in step 310, the amusement device 10 launches the game of chance sequence. The game of chance sequence is preferably, but not necessarily, automatically launched upon the receipt of the currency input of step 305.

The game of chance sequence can be a simulated play of any game of chance, including pachinko, baccarat, slot machine, roulette, blackjack, pinball, a wheel of chance, roll of a die/dice, toss of a coin, drawing of a number and the like. Various other games of chance are known to those skilled in the art and are within the scope of this invention. While the amusement device 10 may use the same game of chance for each instance, the game of chance may also be varied so that different games of chance are presented at different times. For example, games of chance having a higher likelihood of the user or player winning the game of chance may be displayed if the user inputs a relatively large currency amount or a currency amount greater than a predetermined currency amount. Likewise, the games of chance having a lower likelihood of the user or player winning may be displayed if the user inputs a relatively small currency amount or a currency amount less than the predetermined currency amount. In addition, the amusement device 10 may display all of the plurality of games of chance available for selection to the user with only certain of the games of chance available for selection by the user or player, such as the higher likelihood of success games of chance displayed, but unable to be selected for play by the user, thereby indicating to the user that a greater initial input currency amount would permit the user to also select the higher likelihood of success games of chance. The amusement device 10 may be designed and configured to subsequently permit the user to supplement their initial input currency amount to unlock or permit access to certain of the higher likelihood of success games of chance by inputting additional currency amounts. The input of additional currency amounts following the user's initial input of a currency amount preferably provides the user with access of higher likelihood of success games of chance, games of chance that have a higher likelihood of more valuable bonuses being awarded, more entertaining games of chance being available to the user or the like.

The game of chance is preferably displayed to the user in step 315; however, the user's interactions with the amusement device 10 during the display of the game of chance preferably have little or no effect on its outcome. The game of chance is preferably short, determining and displaying a result to the user within approximately five to ten seconds (5-10 s), though longer game of chance sequences are within the scope of this invention. The preferred game of chance includes an animation that draws the user's attention and may increase the user's enjoyment of the amusement device 10 or their interest in whether the determined award bonus will be awarded and in what amount. Alternatively, the game of chance may require user interaction, preferably through the touchscreen video display 12, in order to complete the preferably, relatively short or quick game of chance to determine the bonus or whether a bonus will be applied to the particular play session for the user or player.

The amusement device 10 preferably determines a result of the game of chance sequence in step 320. The result is preferably a randomly or semi-randomly generated bonus to be applied to the user's play session that is determined based on the result of the game of chance. The bonus can be any benefit to the user, including extra lives, free plays, one or more additional credits for the play session, entry into a contest, credit for playing an additional song on a jukebox and the like. The determined bonus is displayed to the user as a result of the game of chance sequence in step 325. For example, if the game of chance sequence is a slot machine roll, the result will be a winning line corresponding to the bonus being awarded. If the game of chance sequence is a wheel of chance, the various landing spots will correspond to the available bonuses. Thus, if the wheel spin stops on a one and on-half times (1.5×) bonus, the user's input currency value will be multiplied by the bonus value of one and one-half (1.5). In the case of a die toss, each of the die values may correspond to various available bonuses. Similarly, each side of a coin may correspond to a different bonus. Likewise, the user or player may be prompted by the touchscreen display 12 to select a card from a deck of cards and the bonus applied may correspond to the suit, denomination, particular card or the like that the user or player selects from the deck.

Regardless the game of chance played, the awarded bonus or determined bonus amount is applied to the user's play session in step 330. The awarded bonus or determined bonus amount may be zero award or nearly any other value or type of award depending upon the outcome of the game of chance. For example, the award bonus amount may be comprised of a free game, one or more extra credits, entry into a contest where additional award bonus may be awarded or the like. Finally, the home screen for the amusement device 10 is displayed to the user in step 335. The information presented on the home screen preferably includes a listing of games available for play on the amusement device 10. Alternatively, the home screen of step 335 may be comprised of a particular game the user selected for game play upon insertion of the currency or at nearly any time prior to the game of chance sequence and application of the bonus. Preferably, the awarded bonus amount must be used during the instant play session; however, in some instances, such as where the user has a user account, the bonus may also be stored in the user's account for use in a future play session. In addition, the awarded bonus amount, once played in a particular game, may contribute to credits, additional plays, additional lives, or the like, which may be stored in a user's account for subsequent use during game play.

Figure 4:
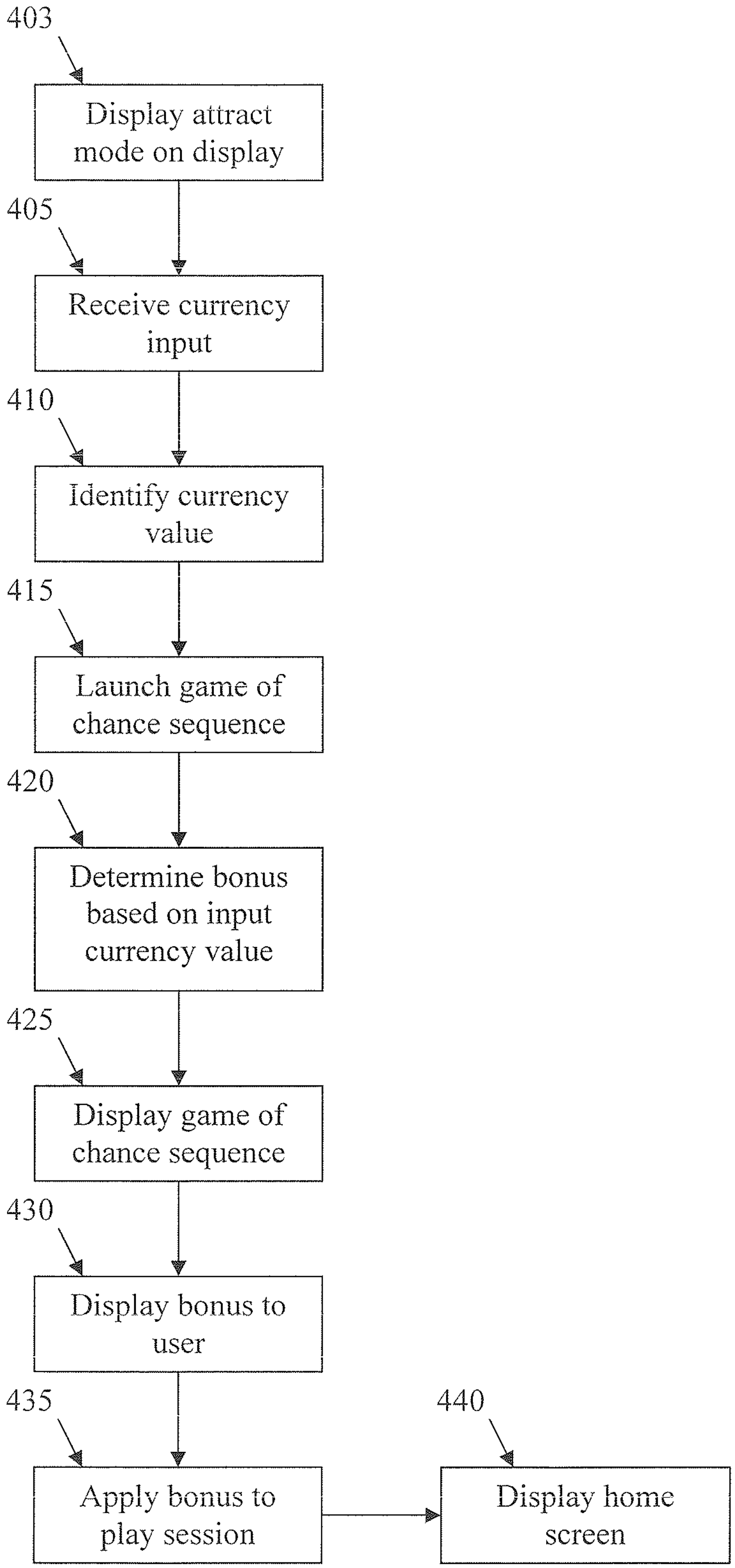
FIG. 4 is an alternative flowchart diagram illustrating steps for determining a bonus awarded to a user's play session in accordance with preferred embodiments of the present invention.

Referring to FIG. 4, a flowchart diagram illustrating steps for determining a bonus awarded to the play session of a user in accordance with another embodiment of the present invention is shown. The amusement device 10 preferably begins in the attract mode at step 403. A user's input of currency is subsequently received by the amusement device 10 at step 405. The amusement device 10 analyzes the currency input to determine a value of the input currency in step 410. The value may be, for example, a number of tokens input; monetary value of coins or bills input or the like. The game of chance sequence is preferably, automatically launched in step 415. The determined value of currency is used in step 420 in order to determine the bonus to be awarded to the user. While the bonus is still determined based on the game of chance being played, the user's odds of winning a better bonus or of winning the bonus at all are improved by inputting a larger currency value. For example, a user's odds of winning a free game are better when inserting a second currency amount, such as a five dollar ($5) bill, than when inserting a first currency amount, such as a one dollar ($1) bill. In a particular preferred embodiment, the amusement device may be configured such that input of the first currency amount of one dollar ($1) results in a zero determined bonus and a one credit determined bonus amount when the inputted currency amount or second currency amount is five dollars ($5). For example, the amusement device 10 may be configured such that the user automatically loses the game of chance when the inputted currency amount is the first currency amount, such as one dollar ($1), and the user automatically wins the game of chance when the inputted currency amount is the second currency amount, such as five dollars ($5).

In step 425, a simulation of the game of chance sequence is displayed to the user. The simulation of the game of chance sequence is preferably, automatically initiated in response to the receipt of the currency amount in step 405. The simulation is preferably an animation of the game of chance being played. As discussed with reference to FIG. 3 above, the selected game of chance is variable, as are the available bonuses. However, regardless the game of chance being displayed, the result of the game of chance corresponds to the bonus being awarded to the user or the bonus not being awarded if the user loses the game of chance. In step 430, the game of chance sequence completes and the result with the corresponding bonus is displayed. In the event that the user loses the game of chance, such as selecting a red card from a deck of cards when the target is a black card, the bonus displayed in step 430 is a zero bonus. Finally, in step 435, the bonus is applied to the user's play session and the home screen for the amusement device 10 is displayed to the user.

Figure 5:
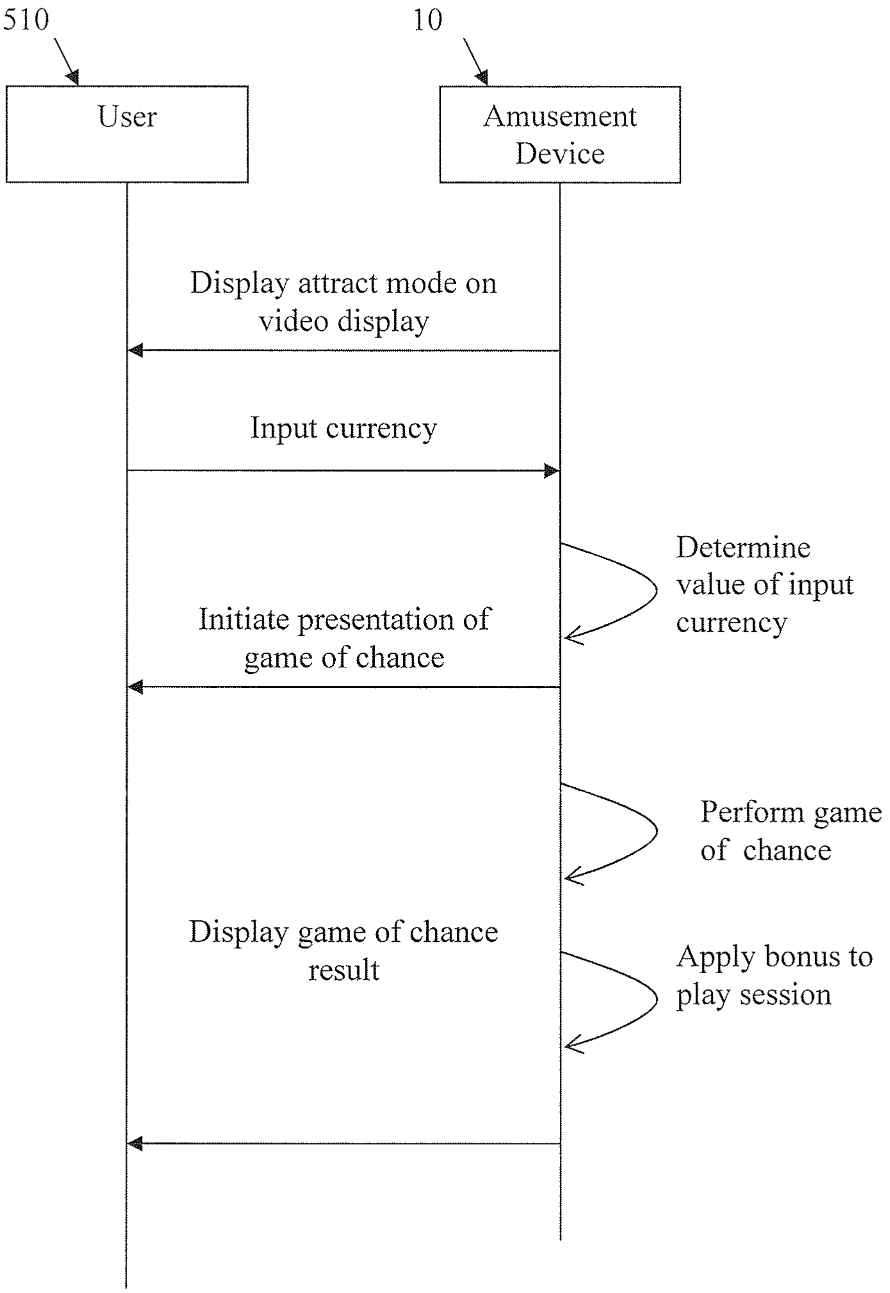
FIG. 5 is a sequence diagram illustrating steps for determining a bonus awarded to a user's play session in accordance with preferred embodiments of the present invention.

FIG. 5 is a sequence diagram illustrating steps for determining a bonus awarded to the play session of a user in accordance with preferred embodiments of the present invention. The amusement device 10 is operating in the attract mode and subsequently receives an input of currency from the user 510. The amusement device 10 automatically switches out of attract mode and analyzes the currency input to determine its value. Next, the amusement device 10 initiates a presentation of a game of chance to the user 510 by outputting one of a plurality of available games of chance to the touchscreen 12. The amusement device 10 receives a selection of a particular game of chance from the user selected from the plurality of available games of chance and/or automatically plays the game of chance without input from the user 510. The result of the game of chance, corresponding to a bonus being awarded, is displayed to the user 510. Though the game of chance is typically played without input from the user, in one embodiment, the amusement device 10 may query the user 510 to ask whether the user would like to initiate the game of chance sequence or go straight to the home screen. Alternatively, the amusement device 10 may query the user 520 regarding whether to initiate the game of chance and/or which game of chance of a plurality of games of chance to initiate.

Figure 6:
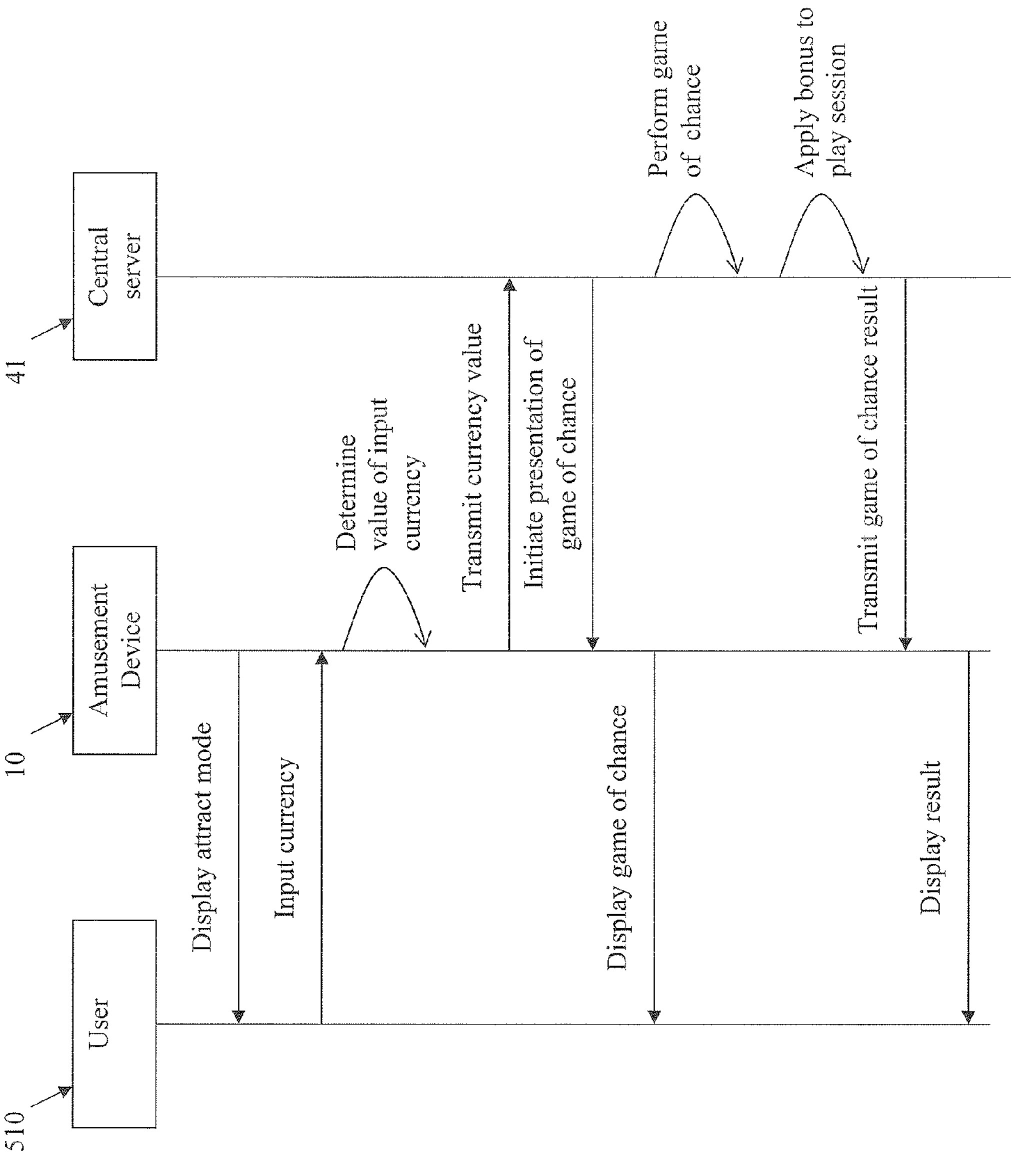
FIG. 6 is an alternative sequence diagram illustrating steps for determining a bonus awarded to a user's play session in accordance with preferred embodiments of the present invention.

FIG. 6 is a sequence diagram illustrating preferred steps for determining a bonus awarded to the play session of a user in accordance with another embodiment of the present invention. In this embodiment, a central server 41 performs the game of chance sequence by communicating with amusement device 10. The amusement device 10 is initially configured in an attract mode, receives an input of currency from user 510 and determines the value or amount of the currency input. The currency amount is transmitted from the amusement device 10 to the central server 41. In response, the game of chance sequence is initiated and displayed to the user 510 through the touchscreen 12 of the amusement device 10. In this embodiment, the central server 41 performs the game of chance and determines the result of the game of chance. The central server 41 may also transmit the plurality of games of chance to the amusement device 10 for selection of one of the games of chance to display for the user or for the user to select one of the games of chance from a listing of the games of chance. The result of the game of chance and the corresponding bonus to be awarded to the user 510 are transmitted to the amusement device 10 and displayed to the user 510, preferably on the video display 12. The result of the game of chance is preferably determined based, at least in part, on the currency value input by the user 510. For example, where blackjack is the game of chance, receiving a score of twenty-one (21) may, for example, award the user a bonus of a free game, several free games or provide playable credits equal to one and one-half (1.5) times the input currency value (e.g., if a user put in five dollars ($5), the user would receive seven dollars and fifty cents ($7.50) of playable credits). Alternatively, where the user receives a score of twenty (20) in a game of blackjack that beats the amusement device's 10 score of sixteen (16), the amusement device 10 may reward the user with the bonus of one extra dollar ($1) of credit for a total of six dollars ($6) of input currency value or amount.

While the several embodiments of the invention have been described with the game of chance sequence appearing whenever a user inputs currency into the amusement device 10, the invention is not so limited. The game of chance sequence may be launched periodically, randomly, pseudo-randomly or the like. In addition, the result of the game of chance may be determined prior to determining the bonus to be awarded. That is, the bonus corresponding to the actual result of the game of chance is presented to the user. Alternatively, the bonus may be selected and the game of chance may be completed such that the selected bonus is the winning result of the game of chance.

The bonuses available for the game of chance are preferably adjustable by the owner, operator, servicing agent and/or by the manufacturer of the amusement device 10. Preferably, the available bonuses or bonus amounts are defined by placing the amusement device 10 into the setup mode, as described above. In setup mode, a graphical user interface ("GUI") for defining the bonuses is presented. Preferably, a subset of all available bonuses for the amusement device 10 are activated by selecting from a drop-down list of the bonuses. In one embodiment, all bonuses selected as available will be given the same odds of winning. In another embodiment, the odds of winning the selected bonus are set individually. In yet another embodiment, the odds of winning the bonus are constant, regardless the amount of currency or value input by the user. For example, the odds of winning a free game or obtaining a certain determined award bonus may always be ten-to-one (10:1), regardless whether the user inputs one dollar ($1) or ten dollars ($10) of input currency. In another embodiment, the odds of winning some or all of the available bonuses are set for various currency ranges, such as the first currency amount being one dollar ($1) and the second currency amount being five dollars ($5). In a particular preferred embodiment, the odds for winning a free game may be set as ten to one (10:1) for an input currency amount up to five dollars ($5) and five to one (5:1) for an currency input amount greater than five dollars ($5). Once all bonuses desired to be activated are selected and the odds are assigned, the amusement device 10 may be placed back into the operating mode. Preferably, the amusement device 10 automatically assigns the various bonuses and odds of winning to the available games of chance. For example, where the game of chance is a wheel of chance, the amusement device 10 distributes the available bonuses on spaces of the wheel such that the odds of winning each of the available bonuses correspond to the odds assigned to the respective bonuses.

In an alternative preferred embodiment, the amusement device 10 may be configured to display a particular game of chance when the input currency amount is equal to or greater than a predetermined currency amount and may display the game selection menu or the particular game selected by the user if the input currency amount is less than the predetermined currency amount. For example, in a preferred embodiment, the predetermined currency amount may be five dollars ($5). If the user inputs five dollars ($5) or more as the initial input currency amount, the amusement device 10 displays the game of chance that permits the potential for a determined bonus amount to be provided. Alternatively, if the user inputs one dollar ($1) or any currency amount less than five dollars ($5), the amusement device 10 preferably toggles directly to the game selection menu or to the game associated with the particular amusement device 10. Accordingly, if the user does not initially input at least five dollars ($5), the user is not shown the game of chance that would provide the opportunity for the user to obtain the determined bonus amount. Therefore, inputting less than five dollars ($5) in this preferred example results in the user receiving a zero determined bonus automatically.

FIG. 7A illustrates schematically various embodiments of implementing an amusement system 1000 including one or more amusement devices 10. A gaming location 8 may, for example, house one or more amusement devices 10 that may each be individually in communication with the central server 41. The definition information is received by the amusement device 10 from the central server 41 over a local area network ("LAN") or a wide area network ("WAN") such as the Internet. The central server 41 is typically geographically remote from the amusement device 10.

The gaming location 8 may also have a central communication hub 22, enabling communication between all of the amusement devices 10 housed therein with the central server 41. In this embodiment, the central communication hub 22 may function as the central server 41 described above. In another alternative arrangement, as shown in FIG. 7B; the gaming location 8 may house its own local server 23, which performs all of the functions listed above with respect to the central server 41 for all of the local amusement devices 10. The local server 23 may be housed in the gaming location 8 and need not be remote to every one of the amusement devices 10.

The amusement devices 10 may be connected to their corresponding servers 41, 23 through conventional communication configurations, such as a LAN, WAN, or the like. In one preferred embodiment, the preferred amusement device 10 may connect to the central server 41 via the Internet. It is thus understood by those skilled in the art that an amusement system 1000 of the preferred embodiments is not limited to the arrangements described above.

The amusement device 10 may also include other functionality and features such as music jukebox, video jukebox, multimedia player, Internet browsing, broadcast media viewing, time based rental mode, non-prize tournaments, prize-based tournaments, head-to-head competitions, prize-based lotteries, ticket dispensing, prize dispensing, debit/credit card charging, phone card dispensing, e-mail, photography, placing customer orders, communicating with other amusement devices, and the like. For a music jukebox application, the amusement device 10 may initially be configured in the attract mode and automatically display a game of chance upon receipt of a currency amount from the user. The result of the game of chance may determine a bonus amount, such as an additional play of a music track or multiple additional plays of music tracks.

The amusement device 10 may also provide for remote or local access for accounting and/or bookkeeping purposes. The amusement device 10 may include a local connector for uploading to a hand-held or portable computer or removable memory for receiving accounting or other data. The amusement device 10 may include accounting and bookkeeping screens accessible by an operator through set up screens and/or through password protection.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for determining a bonus for a play session of an amusement device, the amusement device having a display, a memory and a controller, the method comprising:

a) displaying, by the amusement device, an attract mode on the display, the amusement device displaying a screen to entice a user to interact with the amusement device in the attract mode;

b) receiving, by the amusement device, an input of an initial currency amount to initiate a play session;

c) analyzing the initial currency amount, by the amusement device, to determine if the initial currency amount is a first currency amount less than a predetermined currency amount or a second currency amount equal to or greater than the predetermined currency amount, the second currency amount being greater than the first currency amount, the first currency amount being equal to or greater than a currency amount to initiate game play;

d) displaying, by the amusement device on the display, a game of chance when the initial currency amount is the second currency amount, wherein the bonus is determined based on an outcome of the game of chance; and e) displaying, by the amusement device on the display, a game selection menu when the initial currency amount is the first currency amount, such that the bonus is a zero bonus.

2. The method of claim 1, wherein the display shows animations of game play of various electronic games playable on the amusement device in the attract mode.

3. The method of claim 1, wherein the display is a touchscreen display, the game of chance requires inputs from the touchscreen.

4. The method of claim 1, wherein the game of chance determines the bonus within five to ten seconds of receipt of the initial currency amount in step (b).

5. The method of claim 1, wherein the game of chance is comprised of one of pachinko, baccarat, slot machine, roulette, blackjack, pinball, a wheel of chance, roll of a die/dice, toss of a coin, drawing of a number and drawing of a card.

6. The method of claim 1, wherein the predetermined currency amount is five dollars.

7. The method of claim 1, wherein the game of chance is comprised of a plurality of games of chance stored in the memory.

* * * * *